(12) United States Patent
Lee

(10) Patent No.: US 8,508,665 B2
(45) Date of Patent: Aug. 13, 2013

(54) IMAGE PROCESSING APPARATUS AND CONTROL METHOD THEREOF

(75) Inventor: Young-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/296,808

(22) Filed: Nov. 15, 2011

(65) Prior Publication Data

US 2012/0293713 A1 Nov. 22, 2012

(30) Foreign Application Priority Data

May 19, 2011 (KR) .................. 10-2011-0047552

(51) Int. Cl.
*H04N 5/50* (2006.01)
*H04N 5/44* (2011.01)

(52) U.S. Cl.
USPC .................. 348/569; 348/572; 348/725

(58) Field of Classification Search
USPC ........... 348/569–573, 563, 734, 725; 725/37, 725/38, 59, 68, 85, 100, 131, 139, 151
IPC ................. H04N 5/50, 5/14, 9/64, 5/445, 5/44
See application file for complete search history.

(56) References Cited

U.S. PATENT DOCUMENTS 7,456,903 B2 * 11/2008 Osawa et al. ............... 348/572
2006/0211396 A1 9/2006 Sugata

FOREIGN PATENT DOCUMENTS

EP 1705803 A1 9/2006

OTHER PUBLICATIONS

Communication issued May 10, 2012 by the European Patent Office in counterpart European Application No. 11187821.1.

* cited by examiner

*Primary Examiner* — Sherrie Hsia
(74) *Attorney, Agent, or Firm* — Sughrue Mion, PLLC

(57) ABSTRACT

An image processing apparatus and control method are provided. The image preprocess apparatus includes an image receiver which receives an analog broadcasting signal; an image processor which converts the analog broadcasting signal into a digital broadcasting signal; and a filtering unit which selectively performs a low pass filtering on the analog broadcasting signal to filter a frequency higher than a preset frequency and transmits the selectively-filtered analog broadcasting signal to the image processor corresponding to a reception of the analog broadcasting signal by air.

14 Claims, 5 Drawing Sheets

IMAGE PROCESSING APPARATUS AND CONTROL METHOD THEREOF

CROSS-REFERENCE TO RELATED APPLICATION

This application claims priority from Korean Patent Application No. 10-2011-0047552, filed on May 19, 2011 in the Korean Intellectual Property Office, the disclosure of which is herein incorporated by reference.

BACKGROUND

1. Field

Apparatuses and methods consistent with the exemplary embodiments relate to an image processing apparatus and a control method thereof which receives an analog broadcasting signal and displays an image according to the received broadcasting signal, and more particularly, to an image processing apparatus and a control method thereof which prevents an interference by a signal used by another electronic device when the apparatus receives and processes a broadcasting signal.

2. Description of the Related Art

An image processing apparatus receives an image signal from the outside, e.g., a broadcasting signal from a broadcasting station, and processes the received broadcasting signal according to various image processing procedures to thereby display an image on a display panel provided therein or to output an image to a separate display apparatus. The image processing procedure of the image processing apparatus is in the digital form, and the apparatus converts a broadcasting signal into a digital signal and performs the image processing procedures if the received image signal is not a digital signal but an analog signal.

When an image signal processed by the image processing apparatus is displayed as an image, the displayed image may have noise and the picture quality may be deteriorated. Such noise may arise when an interference signal is mixed when the image signal is processed by the image processing apparatus or mixed when the image processing apparatus receives the image signal. Such occurrence of noise is more significant when the image signal supplied to and processed by the image processing apparatus is an analog signal as compared with a digital signal. In particular, such occurrence of noise is more significant when the analog signal is supplied to the image processing apparatus in a wireless manner as compared with a wired manner.

SUMMARY

According to an aspect of an exemplary embodiment, there is provided an image processing apparatus including an image receiver which receives an analog broadcasting signal; an image processor which converts the analog broadcasting signal into a digital broadcasting signal; and a filtering unit which selectively performs a low pass filtering on the analog broadcasting signal to filter a frequency higher than a preset frequency and transmits the selectively-filtered analog broadcasting signal to the image processor corresponding to a reception of the analog broadcasting signal by air.

The image processor may display on a display unit a setting menu to select whether to receive the analog broadcasting signal by the image receiver by one of air and cable, and the filtering unit may selectively perform the low pass filtering corresponding to the reception mode selected through the setting menu.

The image receiver may receive the analog broadcasting signal by air or cable, and the filtering unit may refrain from performing the low pass filtering to the analog broadcasting signal and may transmit the analog broadcasting signal to the image processor if the signal is received by the image receiver by cable.

The image processor may determine whether the analog broadcasting signal is received by the image receiver by air or cable based on a demodulation method of the analog broadcasting signal and may transmit a determination result to the filtering unit, and the filtering unit may selectively perform the low pass filtering on the analog broadcasting signal according to the determination result provided by the image processor.

According to an aspect of another exemplary embodiment, there is provided a control method of an image processing apparatus, the control method including receiving an analog broadcasting signal; selectively performing low pass filtering on the analog broadcasting signal to filter a frequency higher than a preset frequency corresponding to a reception of the analog broadcasting signal by the image processing apparatus by air; and converting the selectively-filtered analog broadcasting signal into a digital broadcasting signal.

The selectively performing the low pass filtering may include displaying a setting menu to select a reception mode indicating whether to receive the analog broadcasting signal by the image processing apparatus by one of air and cable; and selectively performing the low pass filtering corresponding to the reception mode selected through the setting menu.

The selectively performing the low pass filtering may include not performing the low pass filtering when the analog broadcasting signal is received by the image processing apparatus by cable.

The selectively performing the low pass filtering may include determining whether the analog broadcasting signal is received by the image processing apparatus by air or cable based on a demodulation method of the analog broadcasting signal; and selectively performing the low pass filtering according to the determination result.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
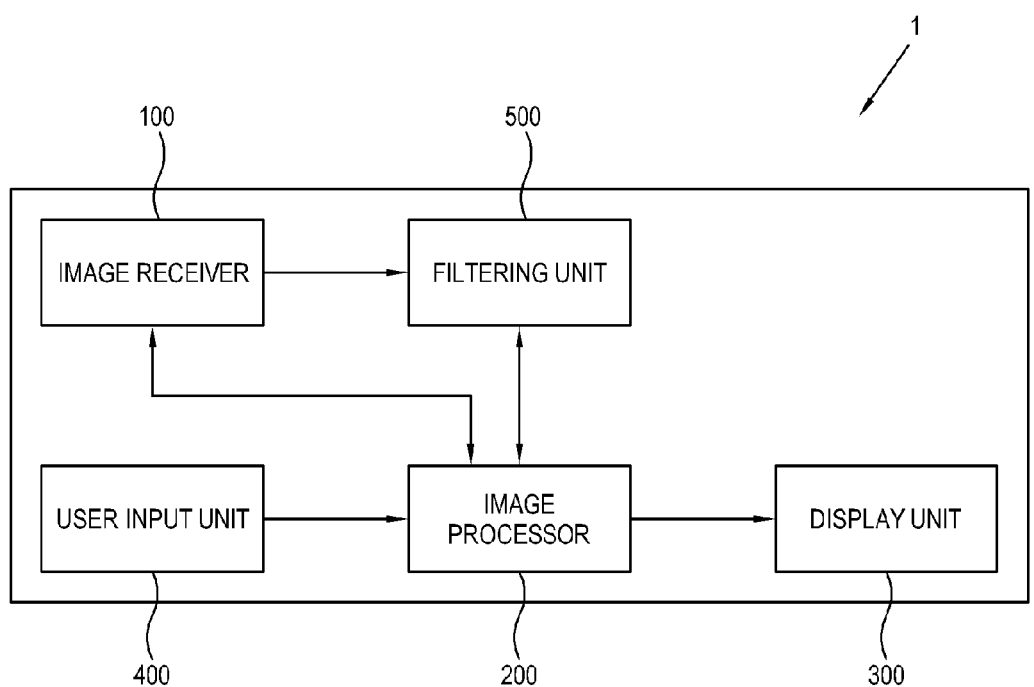
FIG. 1 is a block diagram of an image processing apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an image processing apparatus 1 according to an exemplary embodiment. The image processing apparatus 1 is embodied as a television (TV) which receives a broadcasting signal from a broadcasting station and displays a broadcasting image. As such the TV includes a display panel for displaying an image. However, the present inventive concept may also be applicable to a device that does not include a display panel to display an image thereon. An example of such a device is a set-top box. In that regard, the exemplary embodiment which will be described hereinafter does not limit the spirit of the present inventive concept.

As shown in FIG. 1, the image processing apparatus 1 includes an image receiver 100 which receives a broadcasting signal from a broadcasting station, an image processor 200 which processes the broadcasting signal received by the image receiver 100 according to various preset image processing procedures, a display unit 300 which displays a broadcasting image thereon based on a broadcasting signal processed by the image processor 200, and a user input unit 400 which is manipulated by a user and generates a preset command for controlling an operation of the image processing apparatus 1.

The image receiver 100 receives an analog or digital broadcasting signal from an external image supply source (not shown), e.g., from a broadcasting station in a wireless/wired manner, i.e., by air or by cable. The configuration of the image receiver 100 may vary depending on a standard of the broadcasting signal and a realization method of the image processing apparatus 1. The image receiver 100 may include a cable input (not shown) that is configured to receive an analog broadcasting signal over a cable and a wireless signal input (not shown) that is configured to receive an analog broadcasting signal over air. In the case of an analog broadcasting signal, the image receiver 100 may receive a broadcasting signal realized as a radio frequency (RF) signal according to an air mode in a wireless manner or receive a broadcasting signal realized as a composite/component video signal according to a cable mode in a wired manner.

The image receiver 100 may receive a digital broadcasting signal by a high definition multimedia interface (HDMI). In the present exemplary embodiment, focus will be given to the reception of an analog broadcasting signal by the image receiver 100.

The image processor 200 performs a preset image processing operation on the received broadcasting signal. With the performance of the foregoing process on the broadcasting signal, the image processor 200 outputs a broadcasting image corresponding to a designated channel within the broadcasting signal to the display unit 300 to thereby display the broadcasting image on the display unit 300.

If a broadcasting signal received by the image receiver 100 includes an analog signal, the image processor 200 performs an analog/digital conversion (ADC), and demodulation to transfer a frequency of the broadcasting signal to a baseband. The image processor 200 decodes, de-interlaces, converts a frame refresh rate, scales or enhances a detail of the broadcasting signal transferred to the baseband and performs other various image processing operations.

The image processor 200 may be realized as a group of individual elements which perform the above processes individually or as a system-on-chip (SOC) as a single configuration integrating several functions.

The display unit 300 displays an image thereon based on a broadcasting signal output by the image processor 100. The realization method of the display unit 300 is not limited, and may include a liquid crystal, plasma, light-emitting diode, organic light-emitting diode, surface-conduction electron-emitter, carbon nano-tube, nano-crystal, etc. method.

The user input unit 400 is manipulated by a user to generate a preset command relating to various control operations of the image processing apparatus 1 and transmits such command to the image processor 200. The image processor 200 performs an image processing operation corresponding to the command transmitted by the user input unit 400. The configuration of the user input unit 400 may vary as long as the user input unit 400 is manipulated by a user. For example, the user input unit 400 may include a menu key installed in an external side of the image processing apparatus 1, or the user input unit 400 may receive a signal from a remote controller which is remotely provided to the image processing apparatus and communicates with the image processing apparatus 1.

The process of receiving an analog broadcasting signal by the image receiver 100 to performing a demodulation by the image processor 200 will be described with reference to FIG. 2.

Figure 2:
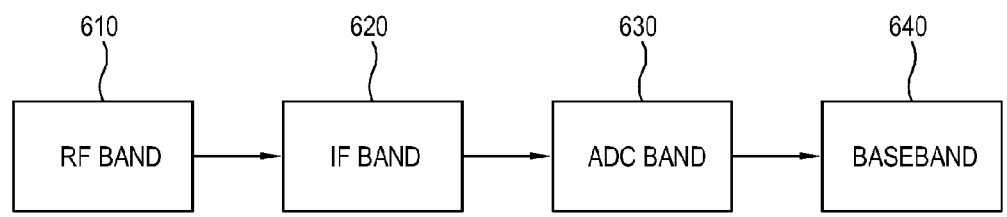
FIG. 2 illustrates an example of transferring and processing a frequency band of an analog broadcasting signal by the image processing apparatus in FIG. 1.

FIG. 2 illustrates an example of transferring and processing a frequency band of an analog broadcasting signal. The process in FIG. 2 relates to an RF signal.

Generally, a broadcasting signal received by the image receiver 100 includes a plurality of broadcasting channels. Each broadcasting channel includes three components of a brightness signal, a chroma signal and an audio signal. With respect to the components of each broadcasting signal, a central frequency is formed in a frequency band within a frequency domain. The analog broadcasting signal has an RF band 610 as a frequency band at the time of being received by the image receiver 100, as shown in FIG. 2.

To perform the image processing operation by the image processor 200 to the broadcasting signal, the demodulation should be performed to transfer the broadcasting signal to the baseband 640. However, it is difficult to directly transfer the broadcasting signal from the RF band 610 to the baseband 640 in terms of the signal processing quality. Thus, the broadcasting signal in the RF band 610 is transferred to an intermediate frequency (IF) band 620 prior to the transfer to the baseband 640.

The transfer of the broadcasting signal to the IF band 620 is performed by mixing with a particular frequency output by a local oscillator (not shown), and accordingly, the broadcasting signal is transferred to the IF band 620 which is lower than the RF band 610.

The broadcasting signal in the IF band 620 is transferred to an ADC band 630 and is converted from an analog signal to a digital signal.

The broadcasting signal in the ADC band 630 is transferred to the baseband 640, and the broadcasting signal at baseband 640 is demodulated. The broadcasting signal demodulated at the baseband 640 is decoded and scaled by the image processor 20 to thereby display an image on the display unit 300.

In the course of receiving and processing the broadcasting signal by the image processing apparatus 1, an interference signal component may be mixed in the broadcasting signal due to various factors and a noise may occur. Such factor may include an inflow of a noise from an oscillator (not shown) within the image processing apparatus 1 while the frequency of the broadcasting signal is transferred. Additionally, noise may occur due to a mixture of another wireless signal in the process of receiving the broadcasting signal by the image processing apparatus 1 by air. Moreover, noise occurs in the broadcasting signal at the RF band 610 phase.

If a broadcasting signal is received by the image processing apparatus 1 by air, the broadcasting signal is received below a preset frequency. The preset frequency is not a limited value, and varies depending on location. For example, the preset frequency is 800 MHz for Europe and 700 MHz for the United States. However, if another electronic apparatus (not shown), e.g., a wireless telephone (not shown) uses a wireless signal, signal inference may arise by the wireless signal with respect to the broadcasting signal of the image processing apparatus 1.

If the image processing apparatus 1 receives a broadcasting signal by cable, the broadcasting signal is transmitted in a wired manner and may minimize the degree of the signal interference compared to the reception by air. Also, the frequency band of the broadcasting signal is higher in the cable mode than in the air mode.

If the broadcasting signal is received by air, the image processing apparatus 1 may eliminate a mixture of a wireless signal of another electronic apparatus to thereby prevent noise in the broadcasting signal. The wireless signal of the another electronic apparatus forms a frequency band higher than the preset frequency, and the mixture to the broadcasting signal may be prevented by filtering the frequency band of the wireless signal.

The image processing apparatus 1 according to the present exemplary embodiment includes a filtering unit 500 which selectively performs a low pass filtering to filter a frequency of an analog broadcasting signal which is higher than the preset frequency when the analog broadcasting signal is received by the image receiver 100 by air, and transmits the selectively-filtered analog broadcasting signal to the image processor 200 (refer to FIG. 1).

When the broadcasting signal is received by the image receiver 100, the filtering unit 500 filters the band higher than the preset frequency with respect to the broadcasting signal by activating the low pass filtering when the broadcasting signal is received by air. The preset frequency is not limited to a specific number, but is formed between a frequency band of a broadcasting signal received by air and a frequency band of a wireless signal used by the another electronic apparatus. Accordingly, the filtering unit 500 may eliminate the wireless signal of the another electronic apparatus from the broadcasting signal by the low pass filtering.

The subject determining the reception mode of the broadcasting signal and selectively activating the low pass filtering of the filtering unit 500 is the image processor 200 or the filtering unit 500 or an additional controller (not shown).

If the broadcasting signal received by the image receiver 100 is received by cable, the low pass filtering of the filtering unit 500 is deactivated. The filtering unit 500 does not perform the filtering to the broadcasting signal and provides the broadcasting signal to the image processor 200.

The reason that the filtering unit 500 does not perform the filtering to the broadcasting signal received by cable is as follows. First, the cable type is a wired transmission method and the possibility of mixing the wireless signal to the broadcasting signal is relatively low. In this case, the filtering operation of the filtering unit 500 may be deactivated to reduce energy consumption. Also, the broadcasting signal transmitted by cable has a higher frequency band than the broadcasting signal transmitted by air. Thus, if the low pass filtering is performed on the basis of the preset frequency band, even a normal broadcasting signal may be filtered.

As above, the filtering unit 500 selectively performs the low pass filtering corresponding to the reception mode of the broadcasting signal, and the mixture of the wireless signal of the another electronic apparatus which may arise in the process of receiving the broadcasting signal by air is prevented. As a result, the noise of the displayed image is minimized and a picture quality is guaranteed.

The timing of performing the filtering by the filtering unit 500 is not limited as long as the filtering is prior to the demodulating timing where the broadcasting signal is transferred to the baseband 640. However, the noise which is mixed at the time of the RF band 610 remains even after the transfer process, and the filtering performed by the filtering unit 500 prior to the transfer of the broadcasting signal to the IF band 620 is advantageous in terms of guaranteeing quality of signals.

Figure 3:
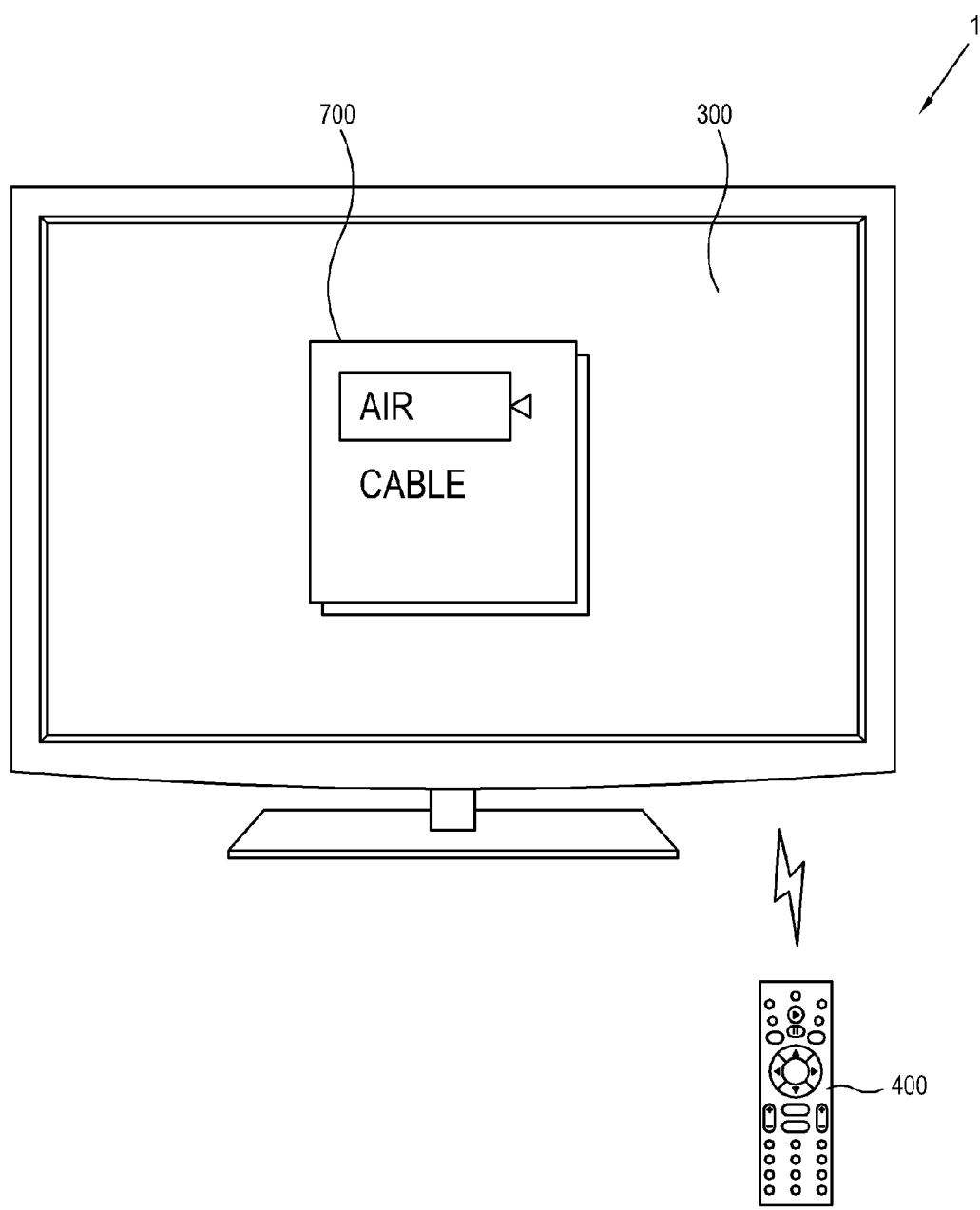
FIG. 3 illustrates an example of setting a reception mode of a broadcasting signal through a setting menu of the image processing apparatus in FIG. 1.

Hereinafter, a method of determining the reception mode of the broadcasting signal received by the image receiver 100 will be described with reference to FIG. 3. FIG. 3 illustrates an example of setting a reception mode of the broadcasting signal by a setting menu 700 of the image processing apparatus 1.

As shown therein, if a user generates a preset command through the user input unit 400, the image processor 200 displays the setting menu 700 on the display unit 300 corresponding to the command. The setting menu 700 is provide to select the reception mode of an analog broadcasting signal, i.e., by air or cable.

A user may select the reception mode of the image receiver 100, i.e., air or cable, from the setting menu 700 through the user input unit 400, and the selected reception mode is stored in the image processing apparatus 1 and referred to when the filtering unit 500 performs a filtering. That is, the filtering unit 500 selectively performs the low pass filtering corresponding to the reception mode of the broadcasting signal selected through the setting menu 700.

Figure 4:
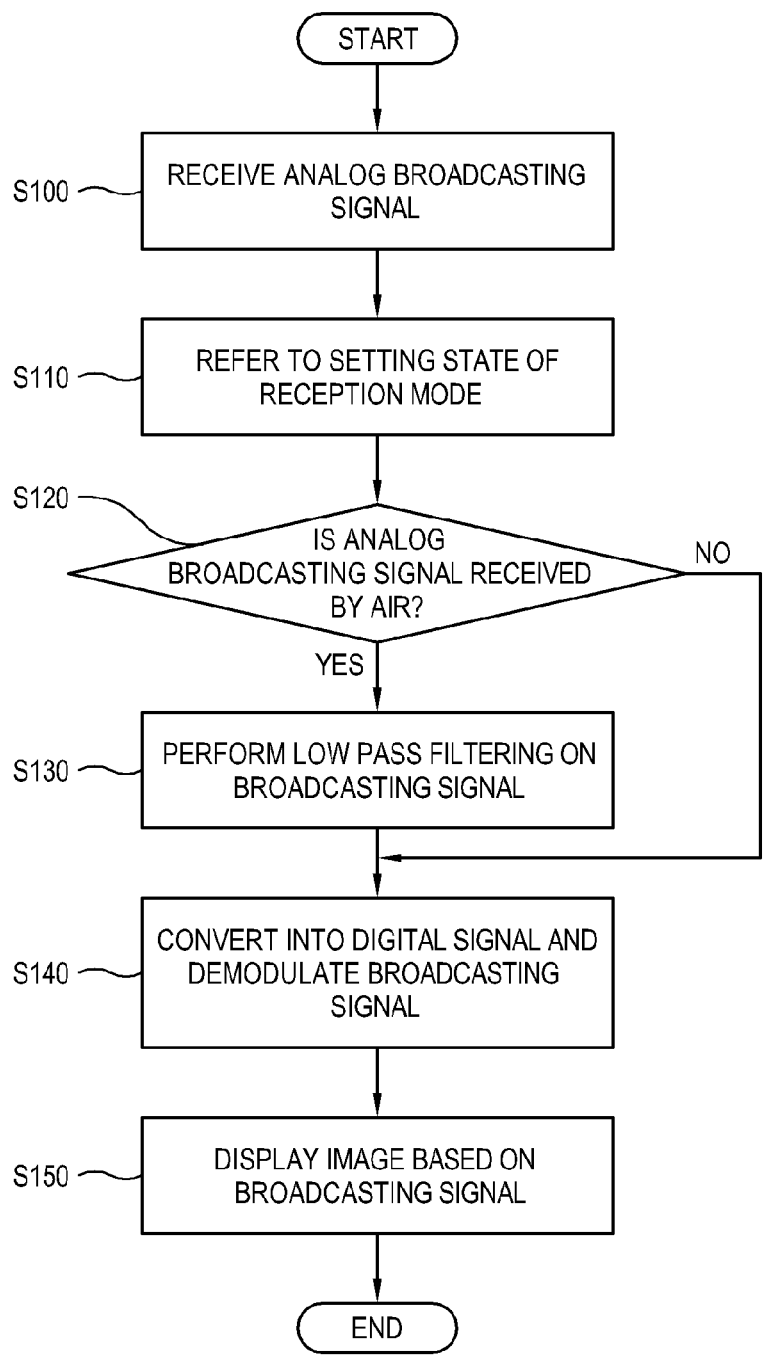
FIG. 4 is a control flowchart of a control method of the image processing apparatus in FIG. 1 according to an exemplary embodiment.

Hereinafter, a control method of the image processing apparatus 1 according to the present exemplary embodiment will be described with reference to FIG. 4. FIG. 4 is a control flowchart of the control method of the image processing apparatus 1.

As shown therein, the analog broadcasting signal is received by the image receiver 100 (S110). The filtering unit 500 refers to the setting state of the reception mode of the broadcasting signal (S110), and determines whether the broadcasting signal is set to be received by air (S120). This setting state is stored according to the selection of the reception mode through the setting menu 700 as shown in FIG. 3.

If the broadcasting signal is set to be received by air, the filtering unit 500 performs the low pass filtering to the broadcasting signal and outputs the broadcasting signal to the image processor 200 (S130).

The image processor 200 converts into a digital signal and demodulates the broadcasting signal (S140). The display unit 300 displays thereon an image based on the broadcasting signal (S150).

If the reception mode of the broadcasting signal is set not to be received by air, e.g. is set to be received by cable at operation S120, the filtering unit 500 does not perform the operation S130. The image processor 200 performs the operations S140 and S150 with respect to the broadcasting signal to which the low pass filtering has not been performed.

The determination of the reception mode of the broadcasting signal according to the setting through the setting menu 700 has been described in the foregoing exemplary embodiment, but the present inventive concept is not limited thereto, and the determination on the reception mode of the broadcasting signal may vary.

Figure 5:
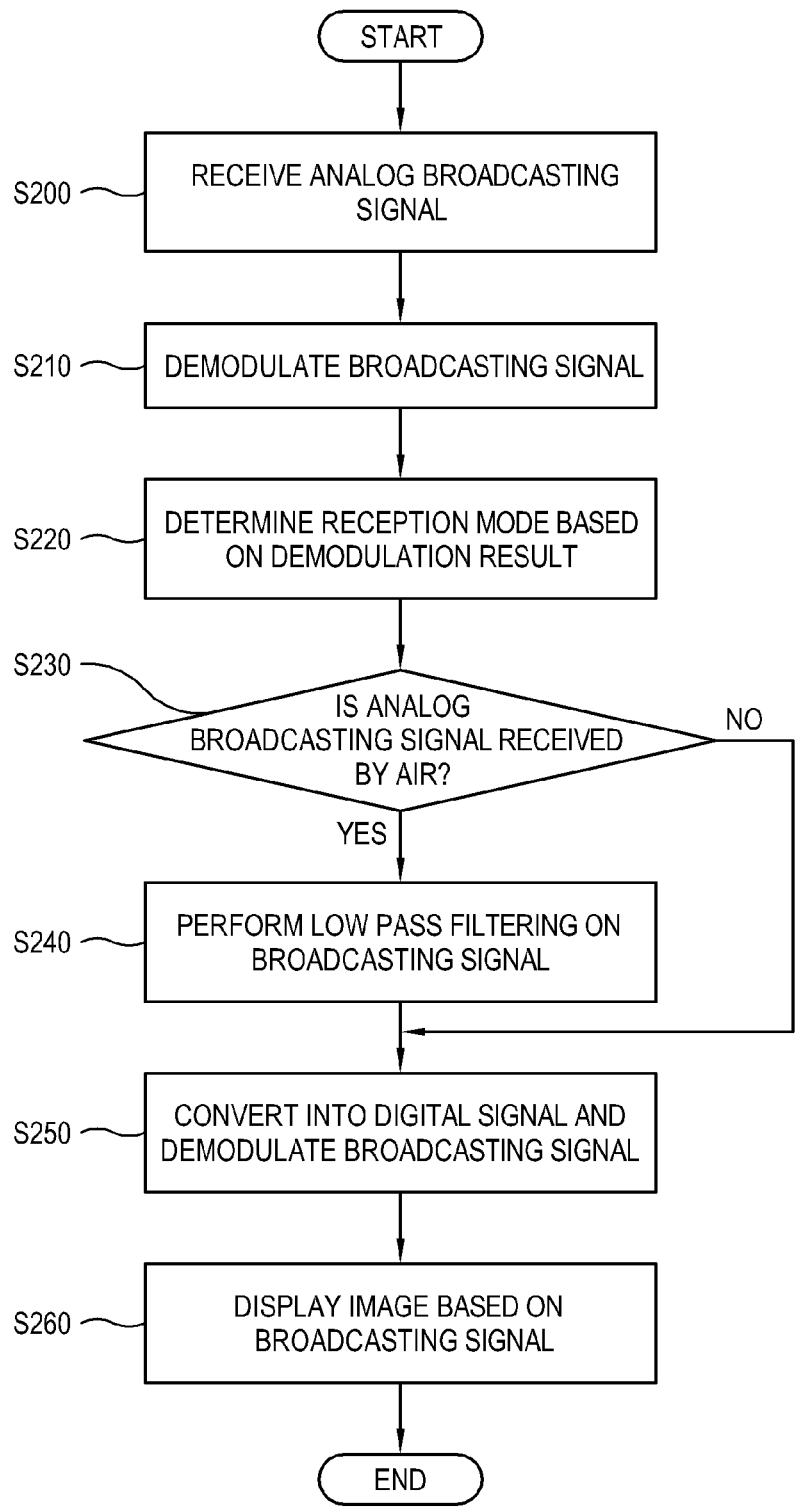
FIG. 5 is a control flowchart of a control method of an image processing apparatus according to another exemplary embodiment.

For example, instead of selection by a user through the setting menu 700, the image processor 200 may determine the reception mode of the broadcasting signal and the filtering unit 500 may selectively perform the filtering to the broadcasting signal according to the determination result of the image processor 200. Such configuration will be described with reference to FIG. 5. FIG. 5 is a control flowchart of a control method of an image processing apparatus 1 according to another exemplary embodiment.

As shown therein, an analog broadcasting signal is received by the image receiver 100 (S200). The image processor 200 transfers a frequency and demodulates the broadcasting signal (S210), and determines the reception mode of the broadcasting signal based on the demodulation result (S220).

The determination method of the reception mode based on the demodulation result may vary. For example, if a broadcasting signal forms a higher frequency band by cable than by air at the time prior to the transfer to the IF band 620, the image processor 200 may determine the reception mode of the broadcasting signal by primarily processing the broadcasting signal.

If the reception mode of the broadcasting signal is determined, the image processor 200 transmits the determination result to the filtering unit 500. Otherwise, the image processor 200 may directly control the filtering unit 500 according to the determination result.

If the broadcasting signal is received by air (S230), the filtering unit 500 performs the low pass filtering on the broadcasting signal and outputs the broadcasting signal to the image processor 200 (S240).

The image processor 200 converts into a digital signal and demodulates the broadcasting signal (S250), and the display unit 300 displays thereon an image based on the broadcasting signal (S260).

At operation S230, if the reception mode of the broadcasting signal is not air, the filtering unit 500 does not perform the operation S240. The image processor 200 performs the operations S250 and S260 on the broadcasting signal to which the low pass filtering has not been performed.

By the foregoing process, the image processing apparatus 1 may prevent noise to the broadcasting signal received by air, which may otherwise arise by a mixture of a wireless signal used by another electronic apparatus (not shown).

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. An image processing apparatus comprising:
an image receiver which receives an analog broadcasting signal;
an image processor which converts the analog broadcasting signal into a digital broadcasting signal; and
a filtering unit which selectively performs a low pass filtering on the analog broadcasting signal to filter a frequency higher than a preset frequency according to determination of reception mode of the analog broadcasting signal by the image receiver,
wherein the filtering unit performs the low pass filtering and transmits the filtered analog broadcasting signal to the image processor if the analog broadcasting signal is received by air.

2. The image processing apparatus according to claim 1, further comprising a display unit, wherein the image processor displays on the display unit a setting menu to select a reception mode that indicates whether to receive the analog broadcasting signal by the image receiver by one of air and cable, and the filtering unit selectively performs the low pass filtering corresponding to the reception mode selected through the setting menu.

3. The image processing apparatus according to claim 1, wherein the image receiver receives the analog broadcasting signal by air or cable, and the filtering unit does not perform the low pass filtering to the analog broadcasting signal and transmits the analog broadcasting signal to the image processor if the signal is received by the image receiver by cable.

4. The image processing apparatus according to claim 1, wherein the image processor determines whether the analog broadcasting signal is received by the image receiver by air or cable based on a demodulation method of the analog broadcasting signal and transmits a determination result to the filtering unit, and the filtering unit selectively performs the low pass filtering on the analog broadcasting signal according to the determination result provided by the image processor.

5. The image processing apparatus according to claim 4, wherein the demodulation method is such that, when the analog broadcasting signal has a frequency band corresponding to a reception mode by cable, which is higher than a frequency band corresponding to a reception mode by air, the image processor determines the reception of the analog broadcasting signal by cable and preferentially processes the analog broadcasting signal.

6. The image processing apparatus according to claim 1, wherein the filtering unit determines the reception of the analog broadcasting signal by air when the analog broadcasting signal received from the image receiver has a frequency band corresponding to a reception mode by air, which is lower than a frequency band corresponding to a reception mode by cable.

7. A control method of an image processing apparatus comprising:
receiving an analog broadcasting signal;
selectively performing low pass filtering on the analog broadcasting signal to filter a frequency higher than a preset frequency according to determination of reception mode of the analog broadcasting signal by the image processing apparatus; and
converting the selectively-filtered analog broadcasting signal into a digital broadcasting signal,
wherein the selectively performing is performed if the analog broadcasting signal is received by air.

8. The control method according to claim 7, wherein the selectively performing the low pass filtering comprises displaying a setting menu to select a reception mode indicating whether to receive the analog broadcasting signal by the image processing apparatus by one of air and cable; and
selectively performing the low pass filtering corresponding to the reception mode selected through the setting menu.

9. The control method according to claim 7, wherein the selectively performing the low pass filtering comprises not performing the low pass filtering when the analog broadcasting signal is received by the image processing apparatus by cable.

10. The control method according to claim 7, wherein the selectively performing the low pass filtering comprises determining whether the analog broadcasting signal is received by the image processing apparatus by air or cable based on a demodulation method of the analog broadcasting signal; and
selectively performing the low pass filtering according to the determination result.

11. The control method according to claim 10, wherein the demodulation method is such that, when the analog broadcasting signal has a frequency band corresponding to a reception mode by cable, which is higher than a frequency band corresponding to a reception mode by air, the image processor determines the reception of the analog broadcasting signal by cable and preferentially processes the analog broadcasting signal.

12. The control method according to claim 7, wherein the reception of the analog broadcasting signal by the image processing apparatus by air is determined when the analog broadcasting signal has a frequency band corresponding to a reception mode by air, which is lower than a frequency band corresponding to a reception mode by cable.

13. A broadcasting signal receiver comprising:
- an image receiver that includes a cable input and a wireless input, and is configured to receive an analog broadcasting signal over a cable by the cable input or over air by the wireless input;
- an image processor which converts the received analog broadcasting signal into a digital broadcasting signal; and
- a filtering unit which selectively performs a low pass filtering on the analog broadcasting signal to filter a frequency higher than a preset frequency according to determination of reception mode of the analog broadcasting signal by the image receiver, wherein, if the analog broadcast signal is received over the air by the wireless input, the filtering unit performs the low pass filtering on the analog broadcast signal, and if the analog broadcast signal is received over cable by the cable input, the filtering unit does not perform the low pass filtering.

14. The broadcasting signal receiver according to claim 13, further comprising a display unit, wherein the image processor displays on the display unit a menu for selecting whether to receive the analog broadcasting signal over the cable or over the air; and
- a user input unit that is configured to receive a selection in response to the display of the menu on the display unit, wherein the filtering unit selectively performs the low pass filtering based on the selection.

* * * * *